Nov. 18, 1969　　A. S. ROBINSON ET AL　　3,479,171
METHOD AND APPARATUS TO PRODUCE TRANSVERSE SURFACE FLOW
OF THE FLOAT GLASS BATH METAL
Filed Nov. 15, 1966　　　　　　　　　　　　2 Sheets-Sheet 1

Inventors
Albert Sidney Robinson
Jack Lawrenson

By Morrison, Kennedy & Campbell
Attorneys

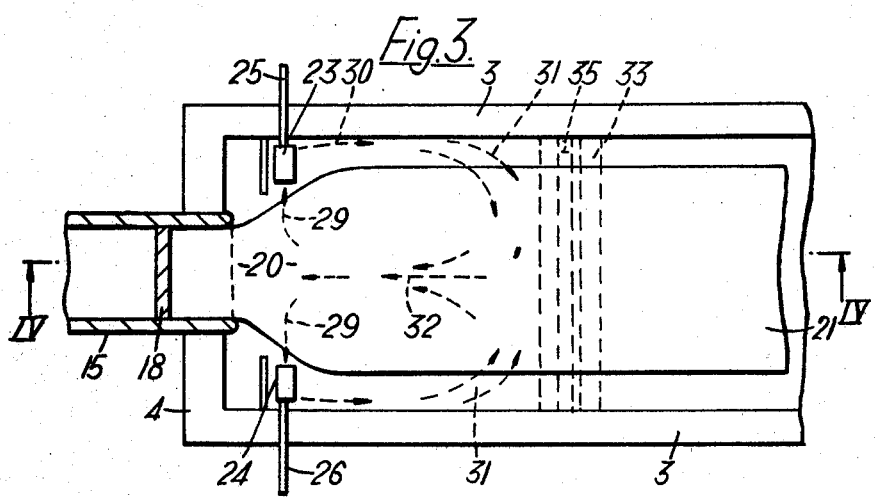
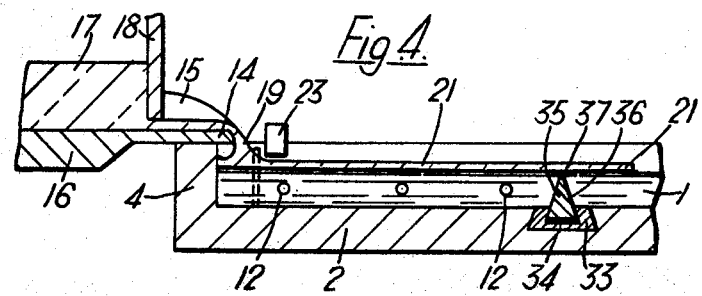
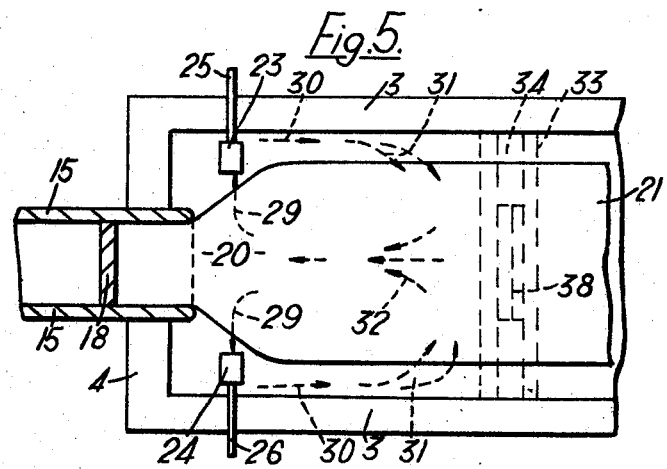

United States Patent Office 3,479,171
Patented Nov. 18, 1969

3,479,171
METHOD AND APPARATUS TO PRODUCE TRANSVERSE SURFACE FLOW OF THE FLOAT GLASS BATH METAL
Albert Sidney Robinson, Southport, and Jack Lawrenson, St. Helens, England, assignors to Pilkington Brothers Limited, Liverpool, England, a corporation of Great Britain
Filed Nov. 15, 1966, Ser. No. 594,425
Claims priority, application Great Britain, Nov. 19, 1965, 49,341/65
Int. Cl. C03b 18/02
U.S. Cl. 65—99          7 Claims

ABSTRACT OF THE DISCLOSURE

The transverse temperature distribution in a molten glass layer established on a molten metal bath in the upstream region of the bath is controlled by employing linear electromagnetic induction motors to produce transverse surface flows in the molten metal supporting that glass layer and by employing baffles upstream of the motors to deflect the transverse surface flows down the marginal sides of the bath.

---

Figure 1:
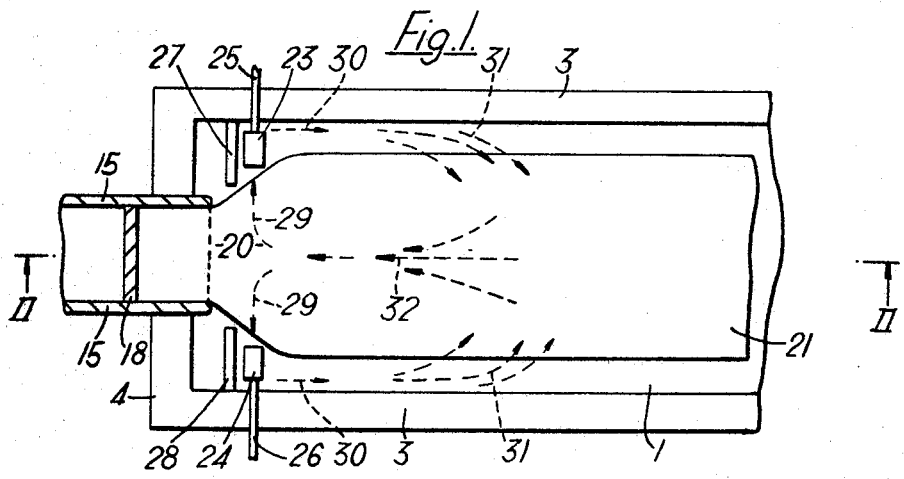

This invention relates to the manufacture of flat glass and more especially to methods and apparatus for the manufacture of flat glass during which molten glass is advanced along a bath of molten metal contained in a tank structure and is advanced along the bath in ribbon form towards the outlet end of the bath. The layer of molten glass is cooled as it is advanced in ribbon form, until eventually the ribbon of glass becomes sufficiently stiffened to be taken unharmed from the bath.

Preferably the bath of molten metal is a bath of molten tin or of a molten tin alloy having a specific gravity greater than glass and in which tin predominates. Desirably the bath of molten metal is so constituted as to have all the characteristics fully described in United States Patent No. 2,911,759.

It is a main object of the present invention to provide improved temperature control of the molten glass supported on the bath of molten metal at the inlet end of the bath.

Another object of the invention is to provide improved distribution of heat through the molten metal of the bath at the inlet end of the bath.

According to the invention, a method of manufacturing flat glass during which glass is delivered on to a bath of molten metal and is advanced along the bath as a molten layer which is cooled as it is advanced in ribbon form towards the outlet end of the bath, is characterised by controlling the transverse temperature distribution across the bath in a region of the bath where the glass is molten by maintaining transverse flows of molten metal from the centre towards the sides of the bath in that region.

It has been found that the best way of creating the desired transverse temperature distribution across the bath is to cause said transverse flows of molten metal to occur at least at the surface of the bath. Thus in an application of the invention where, for example, molten glass is being delivered to the bath at a controlled rate, hot molten metal which receives heat at the centre of the bath is carried out towards the side edges of the bath and the temperature in the region of the bath receiving the molten glass is equalised. From this aspect the invention provides a method of manufacturing flat glass during which molten glass is delivered to a bath of molten metal at a controlled rate to establish a layer of molten glass on the bath, which layer is advanced in ribbon form along the bath towards the outlet end thereof, characterised by creating uniform thermal conditions across the bath in a region of the bath where said layer of molten glass is established by inducing transverse flows of molten metal from the centre towards the sides of the bath in that region of the bath.

The transverse flows of molten metal from the centre towards the sides of the bath are diverted downstream of the bath by the side walls of the tank structure. Molten metal moves up the centre of the bath to feed the transverse flows and the resulting flow pattern may include a circulation of the molten metal in two loops extending downstream of the bath. Any cool molten metal drawn upstream of the bath between these two loops is heated as it travels towards the transverse flows. The rate at which the molten metal is caused to circulate must not be so great as to entrain an undesirable amount of cold molten metal from downstream of the bath.

Advantageously according to the invention the establishment of closed circulation loops at either side of the bath in the region of the hot end of the bath supporting the layer of molten glass may be enhanced by segregating that region of the bath from the rest of the bath. The circulation of molten metal is thus confined to that region.

Such segregation also ensures that any flow of cool molten metal up the bath from the downstream end of the bath is not entrained in the flows at the hot end of the bath, and from this aspect the invention includes segregating the region where the transverse flows are engendered, from the rest of the bath by diverting away from that region any flow of molten metal towards that region from the part of the bath downstream of that region.

Preferably the flows of molten metal from the centre towards the sides of the bath in the region of the bath supporting the molten glass are induced electromagnetically by employing linear induction motors of the kind described and claimed in co-pending United States application No. 558,890, filed June 20, 1966.

The invention also comprehends apparatus for manufacturing flat glass in ribbon form comprising an elongated tank structure containing a bath of molten metal, means for delivering glass at a controlled rate to the bath and advancing the glass along the bath, temperature regulators mounted relative to the tank structure so as to condition the glass and thereby ensure that a layer of molten glass is established on the bath, which layer is advanced along the bath in ribbon form, two linear induction motors respectively mounted above the surface of the bath at each side of the tank structure near to the glass delivering means, which motors point towards the sides of the tank structure and engender transverse flows of molten metal from the central area towards the sides of the bath, and baffle surfaces projecting inwardly into the bath from the tank side walls just upstream of the motors to deflect down the marginal edges of the bath the transverse flows of molten metal emerging from under the edges of the layer of molten glass established on the bath.

The pair of linear induction motors positioned as set out above may produce circulation of the molten metal in closed loops at the hot end of the bath. The operation of the invention may be enhanced by confining that circulation and to this end a transverse barrier may be provided in the floor of the tank structure, of the kind described and claimed in United States application No. 594,424, filed Nov. 15, 1966. This barrier is located at the downstream end of the region of the bath supporting the layer of molten glass established on the bath and projects upwardly in the bath to the vicinity of the surface of the bath, thereby defining a region of the bath at the inlet end of the bath to which region the circulation of molten metal is confined.

It may be sufficient for the transverse barrier to extend only part of the way across the bath of molten metal, being either located centrally leaving spaces between the two ends of the barrier and the side walls of the tank structure, or located in two parts near the side walls leaving a central gap. In a preferred embodiment, however, the transverse barrier extends right across the tank structure from one side wall of the tank structure to the other.

Figure 2:
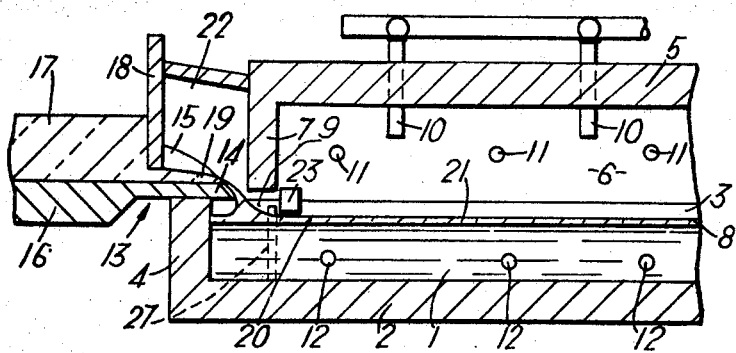

In order that the invention may be more clearly understood some embodiments thereof will now be described, by way of example, with reference to the accompanying drawings, in which:

FIGURE 1 is a plan view of the inlet end of a tank structure containing a bath of molten metal showing a spout for pouring molten glass on to the bath and two linear induction motors for engendering transverse movement of molten metal according to the invention at the hot end of the bath, FIGURE 2 is a sectional elevation through the tank structure of FIGURE 1, on line II—II of FIGURE 1, and showing a roof structure superimposed on the tank structure, FIGURE 3 is a plan view similar to FIGURE 1 of a modified apparatus according to the invention including a transverse barrier extending from wall to wall of the tank structure, FIGURE 4 is a section of line IV—IV of FIGURE 3, and FIGURE 5 is a view similar to FIGURE 3 showing a transverse barrier located centrally in the tank structure leaving spaces between the ends of the barrier and the side walls of the tank structure.

Referring to FIGURES 1 and 2 of the drawings, apparatus for manufacturing flat glass in ribbon form comprises a tank structure containing a bath 1 of molten metal. Only the inlet end of the tank structure is illustrated in the drawings. The bath 1 of molten metal is, for example, a bath of molten tin or a molten alloy of tin in which tin predominates and which has a greater specific gravity than that of the glass. The tank structure comprises a floor 2, side walls 3 and an end wall 4 which together form an integral structure. A roof structure 5 is supported over the tank structure and defines a tunnel-like headspace 6 over the bath. The roof structure 5 includes an end wall 7 which extends downwardly to define, with the surface 8 of the bath of molten metal, an inlet 9 through which glass is advanced along the bath. Protective gas is supplied to the headspace 6 through ducts 10 in the roof structure. The gas is maintained at a plenum in the headspace 6.

Temperature regulators 11 are mounted in the headspace over the bath and temperature regulators 12 are mounted in the bath in order to control the thermal condition of the glass as it is advanced in ribbon form along the bath.

A spout 13 is supported over the end wall 4 of the tank structure, the spout being of generally rectangular cross-section as defined by a lip 14 and side jambs 15. The spout 13 forms an extension of a forehearth 16 of a glass melting furnace and a head of molten glass 17 is held on the forehearth 16 by a regulating tweel 18. Molten glass flows under the tweel 18 and is poured from the spout 13, as indicated at 19, on to the surface 8 of the bath of molten metal in order to establish a layer 20 of molten glass on the bath, which layer is advanced along the bath in ribbon form as indicated at 21 after being permitted to spread laterally under the influence of surface tension and gravity. The spout 13 is enclosed in a chamber 22 extending between the tweel 18 and the end wall 7 of the roof structure.

The temperature gradient down the bath, which is determined by regulation of the temperature regulators 11 and 12 is such that by the time the ribbon of glass 21 reaches the outlet end of the bath it is sufficiently stiffened to be taken unharmed from the bath by conveyor rollers.

At the inlet end of the bath where the layer 20 of molten glass is established on the bath it is desirable to maintain the glass in a molten state for some distance down the bath in order to permit the lateral flow to be completed before the temperature of the glass is substantially reduced. That is, there is a region at the hot end of the bath where the bath of molten metal 1 is supporting on its surface 8 a layer of molten glass.

The hot molten glass 19 delivered to the central region or area of the bath delivers heat to the molten metal in that region so that there is a tendency to build up a transverse temperature gradient at the inlet end of the bath. It is desirable to ensure that uniform thermal conditions are maintained across the whole width of the bath in the region of the bath supporting the layer 20 of molten glass and this is achieved according to the invention by causing flows of molten metal from the centre towards the sides of the bath in that region of the bath.

To this end a pair of linear induction motors 23 and 24 are respectively mounted above the surface 8 of the bath near the side walls 3 of the tank structure just downstream of the lip 14 of the spout 13. The linear induction motors are of the kind described and claimed in United States application No. 558,890 and are respectively mounted on support beams 25 and 26 which pass through the side walls 3 of the tank structure and hold the induction motors 23 and 24 with their lower faces just above the surface level of the bath. Supply pipes for supplying cooling water to the windings of the motors, and the electrical connections to the motors are carried by the support beams 25 and 26, and means are provided for adjusting the support beams 25 and 26 so as to adjust the height of the bottom of the induction motors 23 and 24 above the surface 8 of the bath. This adjusts the depth of penetration of the fields of the motors into the molten metal, for a given value of current supplied to the motors, and so controls the depth of molten metal which is pumped by the motors. Alternatively the strength of the current supplied to the motors may be adjusted so as to control the pumping force on the molten metal at a given depth in the bath.

Just upstream of each of the motors 23 and 24 there is a baffle wall, respectively 27 and 28, which walls project inwardly into the bath from the tank side walls 3 and extend downwardly to the floor 2 of the tank structure, as illustrated in FIGURE 2. The baffle surfaces of these walls just upstream of the motors stops the transverse flows of molten metal induced by the motors from going upstream and deflects the transverse flows towards the sides of the bath of molten metal.

To this end the motors are positioned so that molten metal flows from the central regions under the ribbon towards the edges of the bath as indicated by the arrows 29, and the baffles 27, 28 deflect the flow of molten metal as it emerges from under the edges of the ribbon down the marginal edges of the bath as indicated at 30. The downstream flow 30 is dissipated as indicated at 31. There is a flow of molten metal up the central area of the bath, indicated at 32, which supplies the transverse flows 29, and the rate at which the molten metal is pumped by the motors 23 and 24 is controlled so as not to be so great that an undesirable flow of molten metal from cooler parts of the bath takes place up the central area of the bath. The rate of pumping is regulated so that the upstream central flow 32 is heated gradually as it approaches its incorporation in the transverse flows 29. The resulting flow pattern takes the form of two elongated loops extending downstream of the bath, and some at least of the molten metal pumped in the direction 30 circulates back up the centre of the bath to rejoin the transverse flows 29.

From the foregoing it will be appreciated that the required thermal conditions are obtained at the upstream end of the bath by a symmetrical convection flow across the bath and the heat continuously supplied to the bath from the molten glass delivered to the bath, is more uniformly distributed throughout the region of the bath supporting the molten glass layer 20, thereby controlling the transverse temperature distribution, and ideally creating uniform thermal conditions across the bath in that region.

The confining of the circulation 28 of molten metal to the region of the hot end of the bath may be enhanced by employing apparatus as illustrated in FIGURES 3 and 4 for segregating from the rest of the bath the region of the bath supporting the layer of molten glass 20. To achieve this the floor of the tank structure comprises at a prescribed distance from the inlet end wall 4 of the tank structure a transverse barrier extending right across the whole width of the tank structure.

The barrier comprises a seating member 33 of a refractory material, for example carbon, which is inset into the refractory floor 2 of the tank structure. The top surface of the seating member 33 is level with the top of the floor of the tank structure and in this seating member 33 there is formed a dove-tailed groove 34 extending right across the tank structure. A bar 35 whose cross-section is of triangular form and which is made of a material, for example carbon, of lower specific gravity than the molten metal of the bath, is seated in the groove 34 by being slid into the groove from outside the tank structure through an appropriate aperture in one of the side walls 3 which is afterwards sealed.

The width of the base of the bar 35 is less than the width of the bottom of the groove 34 in which the bar is located and the slope of the sides 36 of the bar 35 matches the slope of the inner faces of the groove 30. The bar 31 floats in the molten metal in the groove 30 but is retained in the groove by engagement of its sloping surfaces 36 with the co-operating surfaces of the groove, in such a position that the top 37 of the bar lies near to the surface of the molten metal under the path of the ribbon of glass.

The bar 35 may be of such form that the apex of the triangular cross-section extends higher than the level 8 of the surface of the bath and in that case the cross-section of the part of the bar underneath the path of travel of the ribbon is truncated so that it lies a short distance underneath the surface of the bath, whereas the apex of the triangular bar extends up through the bath surface at the exposed sides of the molten metal bath alongside the ribbon of glass.

The bar 35 thus provides a barrier to flows of molten metal in the bath and prevents the entrainment of cooler molten metal from the part of the bath downstream of the barrier into the central flow 32. Further, the barrier is effective to divert away from the hot end of the bath any flow of cooled molten metal towards that region from the downstream part of the bath.

Although only one bar is shown in FIGURES 3 and 4 the barrier may comprise two or three bars of the same kind as the bar 35 mounted parallel to each other in parallel dove-tail grooves in the seating member 33.

Thus the barrier just described with reference to FIGURES 3 and 4 located at the downstream end of the region of the bath supporting the layer 20 of molten glass defines that region of the bath at the inlet end of the bath to which the circulation of molten metal is confined thereby assisting the maintenance of uniform thermal conditions across the whole width of that part of the bath supporting the layer of molten glass as an advancing ribbon of glass is developed from that layer.

FIGURE 5 illustrates an alternative barrier arrangement in which the seating member 33 extends right across the floor of the tank structure but the triangular bar is a short bar 38 which is located only in the central region of the bath. In some instances it is advantageous merely to provide a barrier in the central region of the bath, and the short bar 38 is slid into the seating member from one side of the tank structure, and may be held centrally in the groove 34 by distance pieces, not shown, or alternatively its position in the groove may be adjustable to provide optimum working conditions. In another arrangement of the barrier there may be two short bars located in the groove 34 adjacent the side walls 3 of the tank structure, leaving a central gap between the bars.

The invention thus provides a novel method of manufacturing flat glass during which glass is delivered on to a bath of molten metal and is advanced along the bath as a molten layer in ribbon form and in which controlled transverse thermal conditions are assured for the layer of molten glass as it is established on the bath by dispersing through the whole of the region of the hot end of the bath the heat which is delivered to the bath from the glass delivered on to the bath.

We claim:

1. A method of manufacturing flat glass during which glass is delivered on to one end of an elongated bath of molten metal and is advanced along the bath as a molten layer which is cooled as it is advanced in ribbon form towards the outlet end of the bath, comprising inducing by linear electromagnetic induction transverse surface flows in a surface layer of hot molten metal from the centre towards the sides of the bath in the upstream region of the bath supporting the layer of molten glass, converting said transverse surface flows into downstream surface flows along the margins of the bath, and then dissipating said downstream surface flows into the bath downstream of said region.

2. A method of manufacturing flat glass during which molten glass is delivered to one end of an elongated bath of molten metal at a controlled rate to establish a layer of molten glass on the bath, which layer is advanced in ribbon form along the bath towards the outlet end thereof, comprising inducing in the upstream region of the bath supporting the layer of molten glass by linear electromagnetic induction a continuous surface flow of the hot molten metal of the bath in the central area of the bath in a direction upstream in relation to the downstream flow of the glass on the bath to produce transverse flows in a surface layer of the molten metal from said central area near the upstream end of the bath, converting said transverse surface flows into downstream surface flows along the marginal edges of the bath, and dissipating said downstream surface flows into the bath.

3. A method according to claim 2, further comprising segregating said upstream region of the bath from the rest of the bath.

4. A method according to claim 3, wherein segregating said upstream region from the rest of the bath comprises diverting away from that region any flow of molten metal towards said upstream region from the part of the bath downstream of that region.

5. Apparatus for manufacturing flat glass in ribbon form comprising an elongated tank structure having entrance and exit ends and containing a bath of molten metal with an enclosed headspace for gas, means for delivering glass at a controlled rate to the bath at the entrance end of said tank structure and advancing the glass along the bath on the surface thereof, temperature regulating means disposed in heat exchange relationship with the bath so as to condition the glass and thereby ensure that a layer of molten glass is established on the bath, which layer is advanced along the bath in ribbon form towards the exit end of the tank structure, two linear electromagnetic induction motors respectively mounted above the surface of the bath at each side of the tank structure and adjacent the entrance end thereof, which motors point towards the sides of the tank structure and engender transverse surface flows of molten metal from the central area of the bath towards the marginal sides of the bath, and baffle means projecting inwardly and downwardly into the bath from the tank side walls adjacent and upstream of the motors to deflect down the marginal sides of the bath the transverse surface flows of molten metal emerging from under the edges of the layer of molten glass established on the bath.

6. Apparatus according to claim 5, wherein the floor of the tank structure comprises a transverse barrier to the flow of molten metal in the bath, which barrier is located at the downstream end of the upstream region of the bath supporting the layer of molten glass established on the bath and projects upwardly in the bath to the vicinity of the surface of the bath, thereby defining an upstream region of the bath at the inlet end of the bath.

7. Apparatus according to claim 6, wherein the transverse barrier extends right across the tank structure.

References Cited
UNITED STATES PATENTS

| | | | |
|---|---|---|---|
| 789,911 | 5/1905 | Hitchcock | 65—182 |
| 2,198,304 | 4/1940 | Cornelius | 65—182 |
| 2,904,321 | 9/1959 | Bostroem | 65—182 |
| 3,231,351 | 1/1966 | Brichard | 65—182 |
| 3,345,149 | 10/1967 | Michalik | 65—99 |

S. LEON BASHORE, Primary Examiner

E. R. FREEDMAN, Assistant Examiner

U.S. Cl. X.R.

65—65, 162, 182